United States Patent
Chawda et al.

(10) Patent No.: US 10,572,294 B1
(45) Date of Patent: Feb. 25, 2020

(54) AUTOMATED APPLICATION FOOTPRINT DISCOVERY FOR APPLICATION MIGRATION TO CONTAINERS

(71) Applicant: Amazon Technologies, Inc., Seattle, WA (US)

(72) Inventors: Vivek Chawda, Albany, CA (US); Maxwell Edward Chapman Nuyens, Redwood City, CA (US); Vivek Menon, San Jose, CA (US); Keshav Sethi Attrey, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 15/861,064

(22) Filed: Jan. 3, 2018

(51) Int. Cl.
*G06F 9/455* (2018.01)
*G06F 16/18* (2019.01)

(52) U.S. Cl.
CPC .......... *G06F 9/45558* (2013.01); *G06F 16/18* (2019.01); *G06F 2009/4557* (2013.01); *G06F 2009/45579* (2013.01); *G06F 2201/84* (2013.01); *G06F 2209/482* (2013.01)

(58) Field of Classification Search
CPC ................................................. G06F 9/45558
See application file for complete search history.

(56) References Cited

U.S. PATENT DOCUMENTS

| | | | |
|---|---|---|---|
| 8,171,482 B1* | 5/2012 | Vlaovic | G06F 8/71 717/148 |
| 2011/0066719 A1* | 3/2011 | Miryanov | G06F 11/3495 709/224 |
| 2014/0115285 A1* | 4/2014 | Arcese | G06F 9/45533 711/162 |
| 2014/0181800 A1* | 6/2014 | Johansson | G06F 8/70 717/172 |
| 2015/0286470 A1* | 10/2015 | Dahan | G06F 11/3636 717/127 |
| 2017/0052772 A1* | 2/2017 | Chen | G06F 9/45558 |

* cited by examiner

*Primary Examiner* — Hang Pan
(74) *Attorney, Agent, or Firm* — Nicholson De Vos Webster & Elliott LLP

(57) ABSTRACT

Techniques for automated application footprint discovery for application migration to containers are described. A snapshot of an application instance can be stored, the snapshot including the application instance and resources used by the application instance at runtime. The application instance can be run in an intermediate virtual machine, the intermediate virtual machine including at least one interceptor. At least one dependency of the application instance can be determined using the at least one interceptor while the application instance executes on the intermediate virtual machine. A template including the at least one dependency can be created and an application environment can be generated using the template.

18 Claims, 7 Drawing Sheets

```
402 — Template
      {
403 —    OS-Configuration:
         {
405 —       OS: "Windows Server 2016"
            {
404 —          "registry": [
                  {
                     "path": "HKEY_LOCAL_MACHINE\\SOFTWARE\\PATH\\CurrentVersion",
                     "values": [
                        "CSDVersionNumber",
                        "PatchLevel",
                        "Uninstall",
                        "Version"
                     ]
                  }
                  ...
               ],
            }
            ...
         }
406 —    "files": [
            "C:\\Program Files (x86)\\Common Files\\Shared\\VC\\dia100.dll",
            ...
         ]
      }

408 — Registry Dump
      [
         {
410 —       "path": "HKEY_LOCAL_MACHINE\\SOFTWARE\\Classes\\.dacpac",
412 —       "values": [
               {
                  "name": "",
                  "type": "1",
                  "data": "ssms.dacpac.14.0"
               }
               ...
            ]
         }
         ...
      ]
```

*FIG. 4*

AUTOMATED APPLICATION FOOTPRINT DISCOVERY FOR APPLICATION MIGRATION TO CONTAINERS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF DRAWINGS

Various embodiments in accordance with the present disclosure will be described with reference to the drawings, in which:

FIG. 4 is an example of a template according to some embodiments.

DETAILED DESCRIPTION

Various embodiments of methods, apparatus, systems, and non-transitory computer-readable storage media for dynamic quarantine of impaired servers are described. According to some embodiments, a snapshot of an application instance can be stored, the snapshot including a backup of the application instance and resources used by the application instance at runtime. The application instance can be run in an intermediate virtual machine, the intermediate virtual machine including at least one interceptor. At least one dependency of the application instance can be determined using the at least one interceptor while the application instance executes on the intermediate virtual machine. A template including the at least one dependency can be created and an application environment can be generated using the template.

As more applications are moved into virtualized environments, there is an increased demand to migrate on premises applications into the virtualized environment. One way of doing this is to use containers, which allow an application to execute largely independent of, and isolated from, the underlying operating system of a host machine in the virtualized environment. To containerize an application, the application's footprint (e.g., the various resources, files, registries, settings, etc.) used by the application need to be identified. Embodiments automatically identify the footprint of an application and containerize the application. As discussed further below, the dependencies of an application can be identified using one or more interceptors. The interceptors may capture or otherwise monitor the application's input/output (I/O) requests, registry requests, etc., without interfering with the execution of the application. For example, an interceptor may act inline in the "path" of requests issued by an application seeking to access some data (e.g., a file, a registry value) and thus receive such requests before they are provided to or passed on to another layer (e.g., an underlying file system, a registry) to be serviced. However, an interceptor can also be deployed in a non-inline manner, and may instead observe the requests without being in the request path itself, such as via monitoring system or access logs, etc. Once the application's dependencies have been identified, they may be used to generate a container for the application. Interceptors can be used to monitor various system calls, such as I/O calls, network calls, operating system-specific configuration data calls, etc. For example, in a Windows environment, an interceptor may include a filter driver, such as a file system filter driver and/or a registry filter driver.

Figure 1:
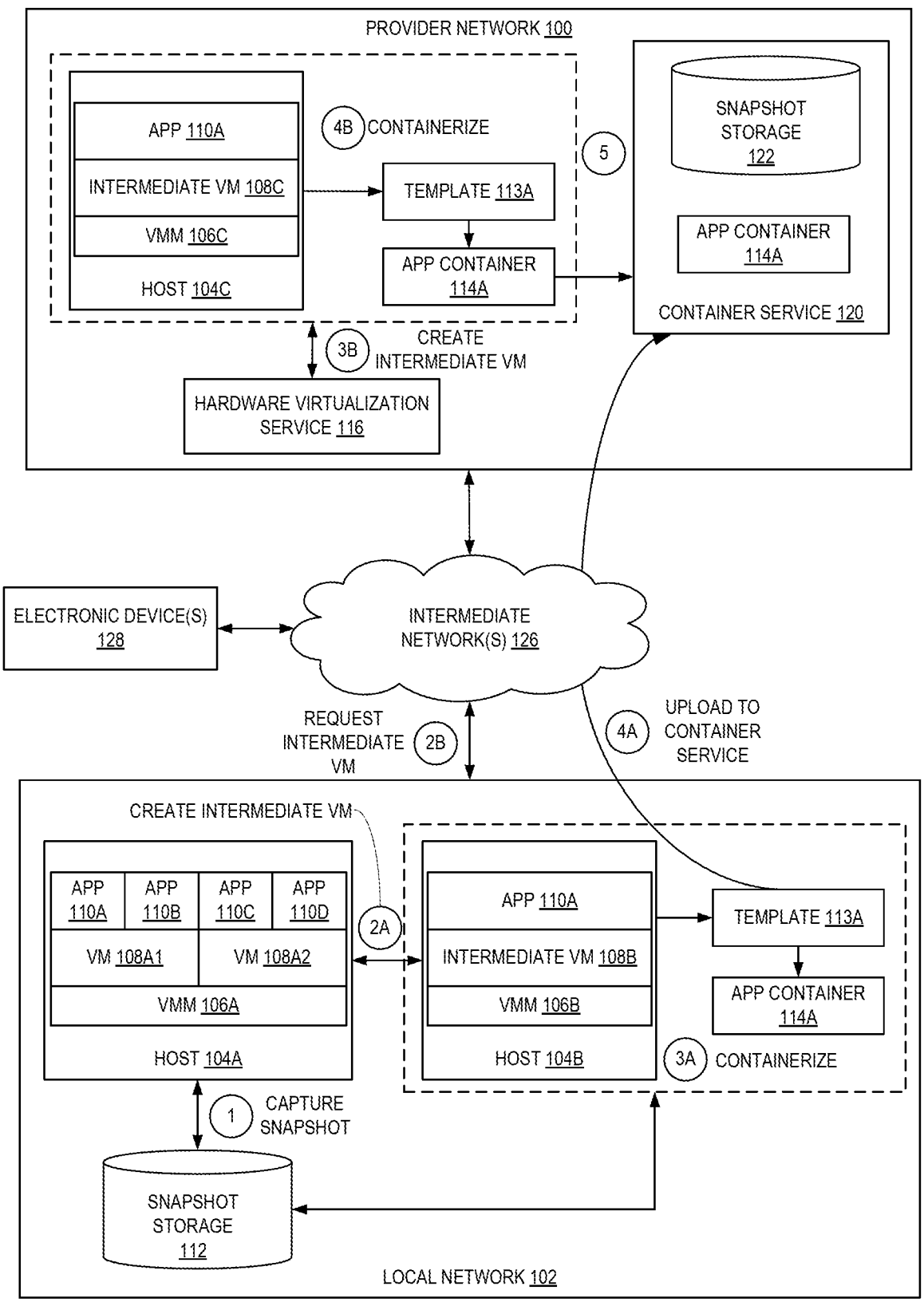
FIG. 1 is a diagram illustrating an environment for automated application footprint discovery for application migration to containers according to some embodiments.

FIG. 1 is a diagram illustrating an environment for automated application footprint discovery for application migration to containers according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 126 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers. The users may access the provider network using one or more electronic devices 128 connected to the intermediate networks 126. The one or more electronic devices may include computing devices such as desktop, laptop, or mobile computing devices, servers, virtual machines, or other devices.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

Local network 102 may be an on premises customer network implemented on the customer's computing resources. For example, local network 102 may include hardware virtualization technology that enables multiple operating systems to run concurrently on a host computer (e.g., hosts 104A and 104B), i.e., as VMs 108 on the hosts 104. The VMs 108 may, for example, be executed in slots on the hosts 104. A hypervisor, or virtual machine monitor (VMM) 106, on a host 104 presents the VMs 108 on the host with a virtual platform and monitors the execution of the VMs 108. Each VM 108 may be provided with one or more local IP addresses; the VMM 106 on a host 104 may be aware of the local IP addresses of the VMs 108 on the host.

Provider network 100 may include hardware virtualization technology that enables multiple operating systems to run concurrently on a host computer (e.g., host 104C), i.e., as VMs 108 on the hosts 104. The VMs 108 may, for example, be executed in slots on the hosts 104 that are rented or leased to customers of a network provider. A hypervisor, or VMM 106, on a host 104 presents the VMs 108 on the host with a virtual platform and monitors the execution of the VMs 108. Each VM 116 may be provided with one or more local IP addresses; the VMM 106 on a host 104 may be aware of the local IP addresses of the VMs 108 on the host. The provider network 100 may, for example, provide customers the ability to implement virtual computing systems (e.g., VMs 108) via a hardware virtualization service 116.

Local network 102 enables the customer to run various applications 110A-110D (or "apps") on premises, on the customer's own resources (e.g., host 104A). This typically provides greater control and customizability of the applications and data by the customer. However, as more resources are migrated to infrastructure provided by various provider networks (e.g., to provide improved scalability, additional access to compute resources, etc.), there is a need to provide reliable migration of applications from on premises networks, such as local network 102, to provider networks, such as provider network 100.

Embodiments can migrate on premises applications to a provider network environment using containers. Containers provide a lightweight package (e.g., an image file) that includes various resources for an application to run. For example, a container may include configuration settings, network settings, registries, files, etc. (e.g., collectively "dependencies") used by the application in regular operation, isolating the application from the underlying system on which it is running. Multiple containers may run on a same host machine and share the underlying O/S across them, and in some embodiments, may also share those dependencies that are used by multiple applications. Because an application in a container is isolated from the underlying O/S, to create a container from an existing application, that application's dependencies (e.g., the files, registries, configuration and network settings, etc.) need to be known or discoverable. Although embodiments are generally described with respect to migrating on premises applications to containers, in some embodiments similar techniques may be used to migrate applications from a host provided by hardware virtualization service 116 to a container.

As shown in FIG. 1, a host 104A may run multiple VMs 108A1-108A2, each running multiple applications 110. Determining the dependencies of a particular one of these applications in such an environment can be difficult, as each application and VM may introduce additional noise (e.g., additional I/O operations, registries or configuration files being accessed, etc.) which may make it difficult to identify which dependencies belong to which of the applications. As such, embodiments use an intermediate VM to run an isolated instance of the application being migrated. An application instance can be a computer program, such as a database server, a web server, etc. As shown in FIG. 1, at numeral 1 a snapshot of the application can be captured. The snapshot may be a backup of the application which includes all or some of the resources used to run the application on local network 102. In some embodiments, a snapshot for the application can comprise a VM snapshot of the VM upon which the application executes, which may include files or data structures associated with the application and potentially other files or data structures associated with other applications that may run on the same VM. The snapshot can be stored in snapshot data store 112 (or "snapshot storage"). For example, host 104A may be an on premises production host of the local network 102 and application 110A may be serving live requests. By capturing a snapshot of the application, the next steps can be performed without impacting the production host and application instances.

Next, an intermediate VM can be created to run the application in isolation. In various embodiments, the intermediate VM can be created on a host in local network 102, or can be requested to be created in provider network 100. For example, as shown at numeral 2A, a host 104B can be run with a single VM, in this example intermediate VM 108B, running the application to be migrated, application 110A. Although the example of FIG. 1 shows an embodiment in which a single application is being migrated, this is for simplicity of explanation. In various embodiments, multiple applications may be migrated using similar techniques, with each running on a different intermediate VM on a same or different host.

In some embodiments, intermediate VM 108B can be created using a virtual machine disk (VMDK) or other virtual machine image such as Hyper-V, which includes one or more interceptors. The intermediate VM 108B can be configured to automatically identify the dependencies of application 110A using an interceptor (e.g., a windows file and registry filter driver, networking interceptor, or other system call interceptor). Application 110A can be run on intermediate VM 108B and one or more interceptors on the intermediate VM monitor I/O requests to the file system, registry, etc. In some embodiments, an interceptor may additionally or alternatively monitor network traffic associated with the application to identify which ports are being used, how the ports are mapped, etc.

Each interceptor produces a list of dependencies. For example, when an I/O file system request for a particular file is detected, the requested information is fetched and returned to the application. Additionally, the entire file can be fetched (e.g., from its location in the file system) and/or a path for the entire file can be added to the list of dependencies for the application. This allows the application to run normally while it is being monitored by the one or more interceptors. In some embodiments, the application may be run in a custom operating system on the intermediate VM, where the custom operating system has various interceptors or other application monitors built in to identify application dependencies.

Once the application has run on the intermediate VM 108B for a sufficient amount of time to populate the list of dependencies (e.g., such that the dependency list does not change for a threshold amount of time), a template 113A may be created using the list of dependencies. As discussed further below, the template may include a list of all dependencies as well as copies of the resources being accessed (e.g., files, registry entries, libraries, etc.) and/or configuration settings, such as network settings. At numeral 3A, the template 113A may be used to generate (also referred to herein as "containerize") an application container 114 for application 110A. Additionally, or alternatively, template 113A may be used to create various application environments, such as virtual machines, devices, or other environments which may execute the application. At numeral 4A, the resulting application container 114 can be uploaded to a container service 120 in provider network 100. A container service can manage one or more compute instances in provider network 100 (e.g., one or more VMs provided by hardware virtualization service 116) and allocate one or more containers to run applications on the one or more compute instances.

Alternatively, as indicated at numeral 2B, a request to create the intermediate VM may be made to the provider network 100. The request may include a machine image (or identify a machine image, such as via a resource identifier (e.g., a Uniform Resource Locator (URL)) associated with the machine image that can be used to obtain the machine image) that may be used by the hardware virtualization service 116 to create the intermediate VM including one or more interceptors. At numeral 3B, hardware virtualization service 116 can configure a host 104C to run the intermediate VM 108C running a single instance of application 110A. Rather than setting up and running the intermediate VM locally, this offloads intermediate VM setup and management to the provider network 100. The intermediate VM 108C may operate similarly to intermediate VM 108B discussed above, monitoring the execution of the application instance using one or more interceptors to create a list of dependencies. This list of dependencies may be used to create a template 113A which is containerized at numeral 4B into application container 114. At numeral 5, the application container 114A is added to container service 120. In some embodiments, container service 120 may also manage a snapshot data store 122 ("snapshot storage"). If, for some reason, a dependency of an application was not detected, container service 120 may make an application's corresponding snapshot available to the application container at runtime, allowing such a missed dependency to be identified and retrieved from the corresponding snapshot.

In various embodiments, once a template is generated for one instance of an application, the template may be used to deploy many instances of the application into different containers or other application environments. For example, given a large number of instances, generating a template for the first instance may take a first period of time to identify the application's dependencies. Subsequently, this template can serve as a base template for identifying the dependencies of the other instances, which may be determined in a second period of time, shorter than the first. This process can be performed more quickly because rather than determining all of the application's dependencies, only the differential between the application instances need to be determined.

Figure 2:
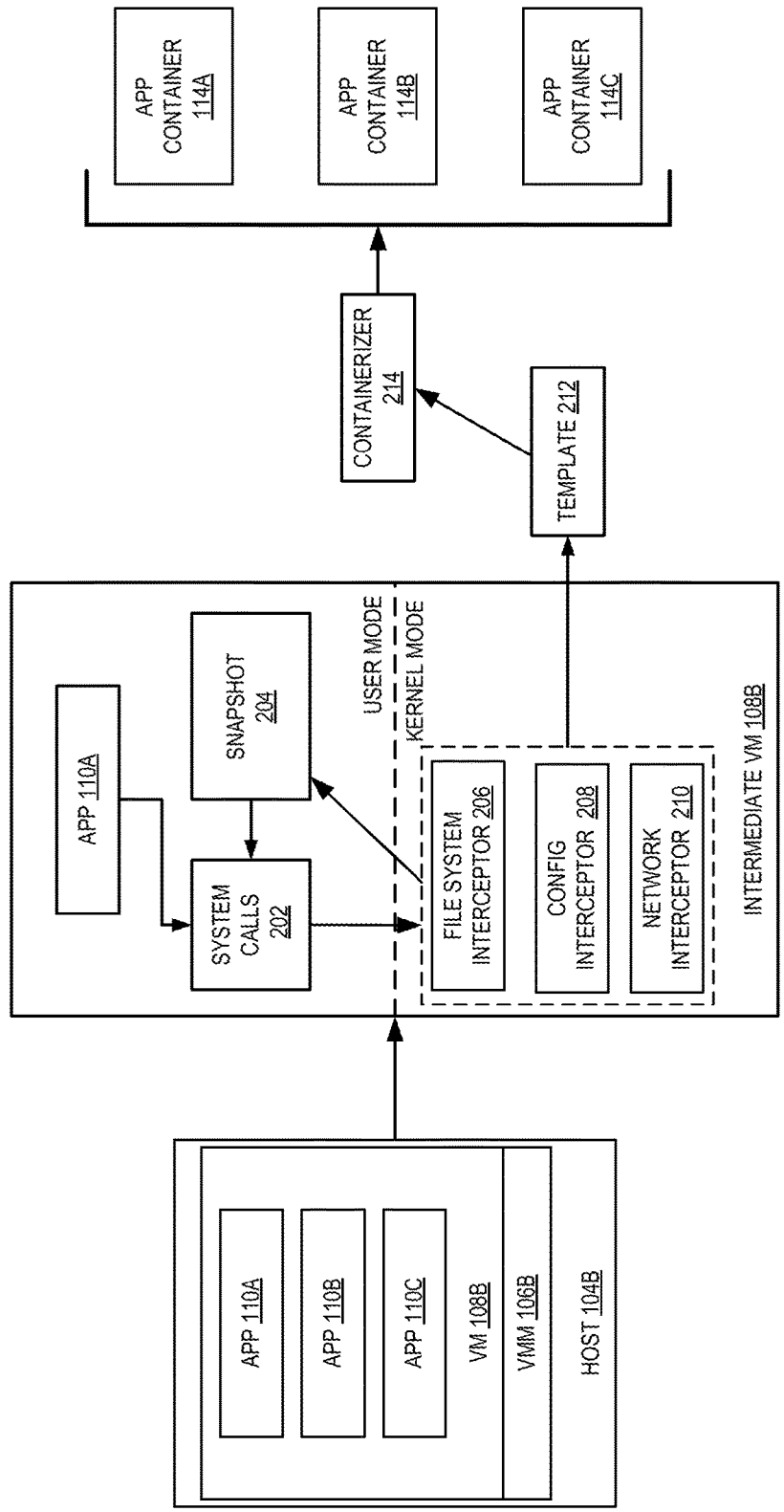
FIG. 2 is a diagram illustrating an example of automated application footprint discovery according to some embodiments.

FIG. 2 is a diagram 200 illustrating an example of automated application footprint discovery according to some embodiments. As discussed above, an application 110A can be isolated on an intermediate VM 108B. The intermediate VM 108B may include various interceptors, such as file system interceptor 206 (e.g., which may monitor requests for data files, application configuration files, O/S configuration files, etc.), OS or application configuration or registry interceptor 208, network interceptor 210, etc. The application 110A can run as usual on the intermediate VM while its requests and other traffic are monitored by the interceptor(s). For example, app 110A may request a file from file system 202. File system interceptor 206 may read the request and determine whether the requested file is in the file system 202. If the requested file is present, then the data that was requested is returned to the application 110A. The file system interceptor can add the file that included the requested data to a list of dependencies for the application 110A. If the file system interceptor determines that the file is not present in the file system, the file system interceptor can retrieve the requested file from the application's snapshot 204 and add it to the file system 202. The requested data may then be returned to the application, and the file system interceptor 206 adds the file to a list of dependencies. Although the interceptors described herein are used in a Windows environment, the principles described herein may be used with filters in other operating system environments, such as Linux, Unix, macOS, etc.

Similarly, if the application 110A attempts to access operating system-specific configuration data (such as a registry in a Windows environment or a configuration file in a Unix or Linux environment), configuration data interceptor 208 can determine whether the requested configuration data (e.g., a registry holding a requested registry key, a configuration file holding a setting or parameter) exists in the intermediate VM; if not, the configuration data (or configuration data value) can be retrieved from the snapshot 204 and provided to the application 110A. The configuration interceptor 208 can add the configuration data to the list of dependencies. In some embodiments, network interceptor 210 can monitor network activity associated with the intermediate VM. For example, the network interceptor can monitor activity on a network interface controller to determine which ports are open for the application and how those ports are mapped. In some embodiments, network interceptor 210 can compare network activity of the application on a local intermediate VM to network activity on a provider network intermediate VM to identify network dependencies that were not identified when running on the local intermediate VM. In some embodiments, calls for configuration data and network calls may be routed through snapshot 204, and configuration interceptor 208 and network interceptor 210 can monitor the requested data to be added to template 212.

In various embodiments, the application may run on the intermediate VM until the dependency list is populated. This length of time may vary from application to application and may be determined based on a confidence level that the dependency list is complete. This may be based on, e.g., an amount of time since the last "miss" (in which a requested object did not exist in the intermediate VM) was detected by an interceptor being greater than a threshold amount of time. In some embodiments, the dependency list may be determined to be complete based on a dependency list available from the application's developer or based on templates that have been generated for modified instances of the same application. To mitigate negative behavior resulting from a potential "missed" dependency, in some embodiments the application's snapshot may be maintained for an amount of time (e.g., a default amount of time, a customer-specified amount of time, etc.). If after deployment of the containerized application, a dependency is determined to be missing, the snapshot can be accessed to see if it includes the dependency. If so, the dependency is accessed and added to the container (or the template is updated to include the dependency and a new container is created).

Additionally, by starting the application in an intermediate VM, the application is forced to run through its startup procedures, which may identify dependencies that are not required once the application has been running in steady-state. In some embodiments, the intermediate VM can be run for a given amount of time without the application installed. This allows any dependencies of the VM that may be missing to be identified. These dependencies can be filtered out from the dependencies identified for the application, as these dependencies exist independently of the application and do not need to be included in the application's container.

In some embodiments, a template 212 can be created from the list of dependencies (e.g., one or more of a list of files, registries, configuration settings, etc.). For example, the template 212 can be a dockerfile which may be used by containerizer 214 to create application containers 114. For example, containerizer 214 can parse the template and retrieve each file, registry key, configuration setting file, etc. to be added to the container. In some embodiments, the container can be created on the intermediate VM 108B where application 110A is running, or the container can be created on another host that includes a containerizer agent in communication with containerizer 214. Once the application container 114A is created for application 110A, the application can be migrated from one host to another by redeploying the container to the new host. As shown in FIG. 2, application containers 114A-114C can be created for each of the applications 110A-110C on VM 108B. In some embodiments, each application 114A-114C can be run on intermediate VM 108B one at a time. For example, once application 114A has been completed, the intermediate VM 108B can be reset and application 110B can be run on the intermediate VM and template generation and containerization can be performed as described above. In some embodiments, because the application can execute largely independently of the underlying operating system, the container can be used to migrate the application from one operating system to another. For example, the application may be running in Windows Server 2008, but once containerized may be deployed to a host running Windows Server 2012. Migrations across other combinations of operating systems may also be performed, depending on the container and application requirements.

Figure 3:
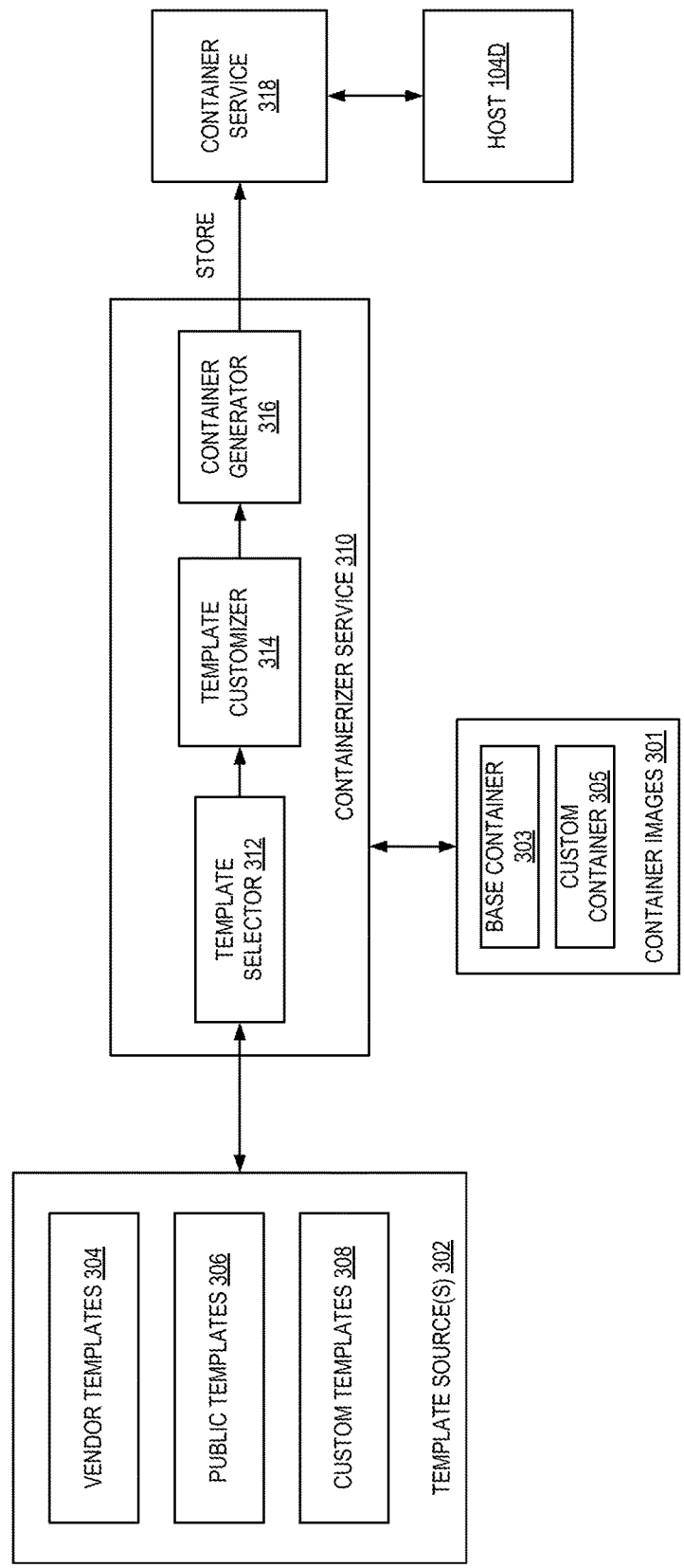
FIG. 3 is a diagram illustrating a containerization service according to some embodiments.

FIG. 3 is a diagram 300 illustrating a containerization service according to some embodiments. In the embodiments described above, containerization is performed after a custom template is created for an application. In some embodiments, containerization may be performed using a template, regardless of the source of the template. For example, template sources 302 may include vendor templates 304 which may be provided by the application's developer. In some embodiments, the application developer may generate their template as discussed above with respect to FIGS. 1 and 2 and confirm that the template is complete for their application. In some embodiments, as custom templates are created by users for various applications, these templates may be made available publicly to other users who also run those applications. These public templates 306 may be made available to a user from a container service, containerizer service 310, or from other sources, such as a public templates library. Custom templates 308 may be generated as discussed above for a user's particular application implementation.

In some embodiments, containerizer service 310 may include a template selector 312 through which a user may specify the template to be used for containerization. The user can select the container from the template sources 302. In some embodiments, containerizer service can include a template customizer 314. A user can select a base template from the template sources 302 and then template customizer 314 can invoke the automated footprint discovery of FIGS. 1 and 2 to create a custom template using the base template. For example, template 212 can start populated with the selected vendor template and the application 110A can be run on intermediate VM 108B while monitored by the interceptors. The base template can be updated with the dependencies identified in application 110A which, for example, may represent the customizations made to the application by the user in their implementation of the application. This enables the custom template to be generated in less time when compared to creating the custom template without a base template.

Container generator 316 can receive the selected template, or a customized template, depending on user input to template customizer 314, and fetch the dependencies identified in the template and generate the container. In some embodiments, the container may be generated using a container image 301 that includes at least a portion of the dependencies used for the container. The container images 301 may include a base container 303 including a default set of dependencies or a customer container image 305 that includes a set of dependencies specified by a user, vendor, or other entity. In some embodiments, container generator 316 can add any dependencies specified in a template that are missing from a container image, or remove any dependencies from the container image that are not included in the template. The container may then be stored to a container storage location, such as container storage 318 (e.g., in a container service of a provider network). In some embodiments, the container is stored on the intermediate VM where the application has been run or another location. The container service can deploy the container to new host 104D, such as migrating the application from an on premises host to a host provided by a hardware virtualization service.

FIG. 4 is an example 400 of a template according to some embodiments. As shown in FIG. 4, the template 402 includes a list of Windows registry key paths 404 and a list of file paths 406. In some embodiments, the registry key is a list of dictionary objects. Each dictionary object has the path key and optionally the values key. The path key describes the path of the registry key to be exported. The values key may include a list of value names for the registry key to be exported. The name of the default value is denoted by an empty string " ". In some embodiments, if the values key is omitted, every value for the registry key is exported. The files key can be a list of file paths to files to be exported. The list can also include a path to a folder, which may cause every file under the folder to be exported. In some embodiments, template 402 can include dependencies for various operating system environments 403. For example, registry key paths 404 and file paths 406 may be provided for one operating system 405. Dependencies may also be included for additional or alternative operating systems under OS configuration 403.

In some embodiments, the template 402, may include a registry dump 408. The registry dump can be a list of dictionary objects, each of which describes a single registry key. The format of the dictionary object can include a path key 410 that describes the path of the registry key to be exported. The values key 412 can include a list of dictionary objects, each of which includes the name, type, and data of a value for the registry key. The name of the default value can be denoted by an empty string " ".

As discussed above, the template 402 can be provided to a containerizer service to create a container for an application. The container includes the dependencies identified for the application in the template, enabling the application to execute using the dependencies in the container, without requiring access to the underlying operating system to which the container is deployed.

Figure 5:
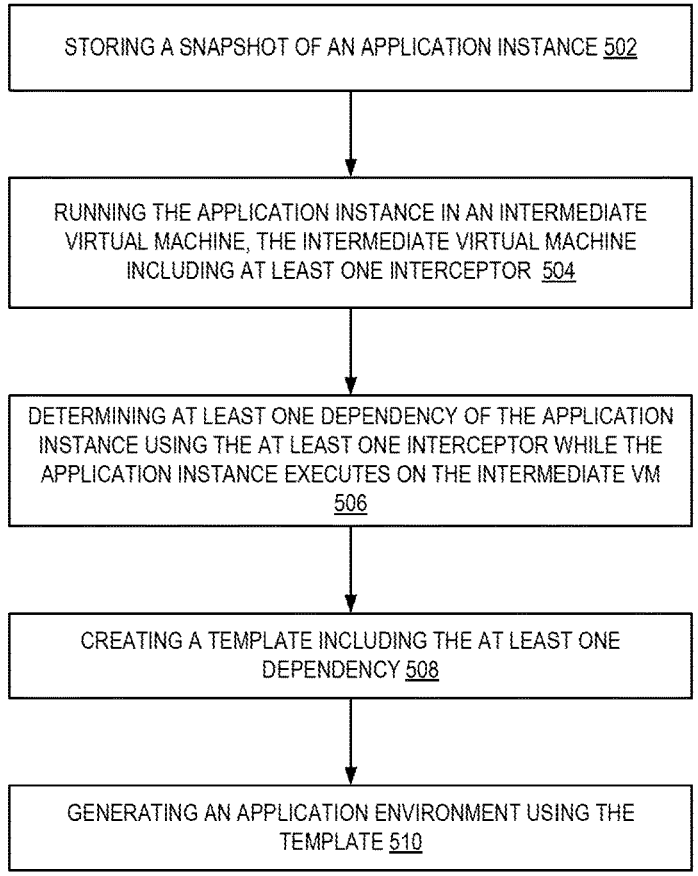
FIG. 5 is a flow diagram illustrating operations for automated application footprint discovery for application migration to containers according to some embodiments.

FIG. 5 is a flow diagram 500 illustrating operations for automated application footprint discovery for application migration to containers according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

In some embodiments, one or more (or all) of the operations 500 are performed by the intermediate VM and a containerization service of the other figures.

The operations 500 optionally may include, at block 502, storing a snapshot of an application instance. In some embodiments, the snapshot can be captured of the application instance running on a host machine in an on premises network. In some embodiments, the application instance may be running on a host machine provided by a hardware virtualization service in a provider network. The snapshot can include a backup of the application instance and a file system and a registry.

At block 503, the operations include identifying at least one dependency of the application instance. In various embodiments, block 503 can include various operations. As one example, at optional block 504, the operations include running the application instance in an intermediate virtual machine, the intermediate virtual machine including at least one interceptor. Because the host machine may be running several different applications, by migrating the application instance to an intermediate virtual machine running only the application instance, the dependencies of the application instance can be more readily identified without the noise of any other applications interfering. The intermediate virtual machine can be implemented in the on premises network or by the hardware virtualization service. In some embodiments, a virtual machine disk image or machine image may be used to create the intermediate virtual machine to include at least one interceptor. In some embodiments, the at least one interceptor includes one or more of a file system interceptor, a registry interceptor, or a network interceptor.

Additionally, at optional block 506, the operations include determining at least one dependency of the application instance using the at least one interceptor while the local application executes on the intermediate virtual machine. In some embodiments, determining dependencies may include monitoring input/output requests by the application instance on the intermediate virtual machine. These may include requests for resources, such as files, registries, libraries, etc. A list of dependencies may be created which includes the requested resources. In some embodiments, a requested resource may not be available (e.g., a request is missed). The unavailable resource can be retrieved from the snapshot of the application instance and returned to the application instance in response to the request. This way, the application instance can continue operating without suffering an error due to a missing resource. Additionally, the missing resource can be added to the list of dependencies and may be added to the intermediate VM so that it is not missed if it is subsequently requested.

As indicated above, in some embodiments block 503 may include other operations. For example, in some embodiments block 503 includes the use of intermediate containers, in which a dependency list (or graph) can be created for the application, and then used to migrate the application to an intermediate container along with dependencies identified in the dependency list. The intermediate container can be executed and monitored using interceptors, allowing for any superfluous dependencies that were initially included (e.g., as a result of activity from other applications or processes) to be identified and eliminated from the dependency list.

As another example, in some embodiments block 503 includes installing one or more interceptors on an existing VM or host device (e.g., in an on-premises environment) to monitor an existing application to detect its dependencies to generate the dependency list. For example, when an existing application is executing in a relatively "clean" environment (e.g., without any or substantial numbers or types of other applications, using a "stock" unmodified operating system, etc.) dependencies can be identified for the application "in place" by monitoring the execution of the application using one or more interceptor(s) for a period of time.

At block 508, the operations include creating a template including the at least one dependency. The template is created from the list of dependencies. The template may include file paths, registry key (or other types of operating system-specific configuration data) paths, application configuration data paths, etc. If a file path is to a folder, the template may include all files and subfolders in that folder.

The template may also include operating system configuration data such as registry key values. In some embodiments, the template may include configuration files. For example, a network interceptor may monitor network traffic generated by the application instance and determine at least one port and at least one port mapping using the network traffic. The port and port mappings may be stored in a network settings file which may be added to the template.

At block 510, the operations include generating an application environment using the template. As discussed, the application environment may include a container, virtual machine, device, or other environment capable of executing the application. For example, a template may be used to migrate an application instance running on a virtual machine in a hosted environment to a bare metal machine, such as a desktop, laptop, or other computing device. Where the application environment is a container, the dependencies identified in the template may be fetched and added to the container. In some embodiments, the template may be a dockerfile or other template file that may be used by a containerizer service to generate a container.

In some embodiments, once the container is created it may be uploaded to a container service in a provider network, and a request can be sent to the container service to deploy the container to one or more host machines in the provider network. The container service may manage one or more hosts provided through a hardware virtualization service to run the container. For example, the container may be deployed to a cluster of hosts running the container. In some embodiments, the snapshot may also be uploaded to the container service and stored in the container service or in a storage location accessible to the container. The snapshot may be retained for a default amount of time, a user specified amount of time, or indefinitely. By retaining the snapshot, any dependencies that may have been missed can be retrieved and added to the container as they are discovered.

In some embodiments, a template created for one instance of an application may be used for other instances of the migration as a baseline template. For example, after a template has been created for one application instance, the template may be reused for a second instance of the application. As discussed this reduces the amount of time needed to create a custom template for the other instances of the application. In some embodiments, a second application instance can be run in the intermediate virtual machine. A second at least one dependency for the second application instance; and creating a second template, the second template include the second at least one dependency and the at least one dependency from the template.

Figure 6:
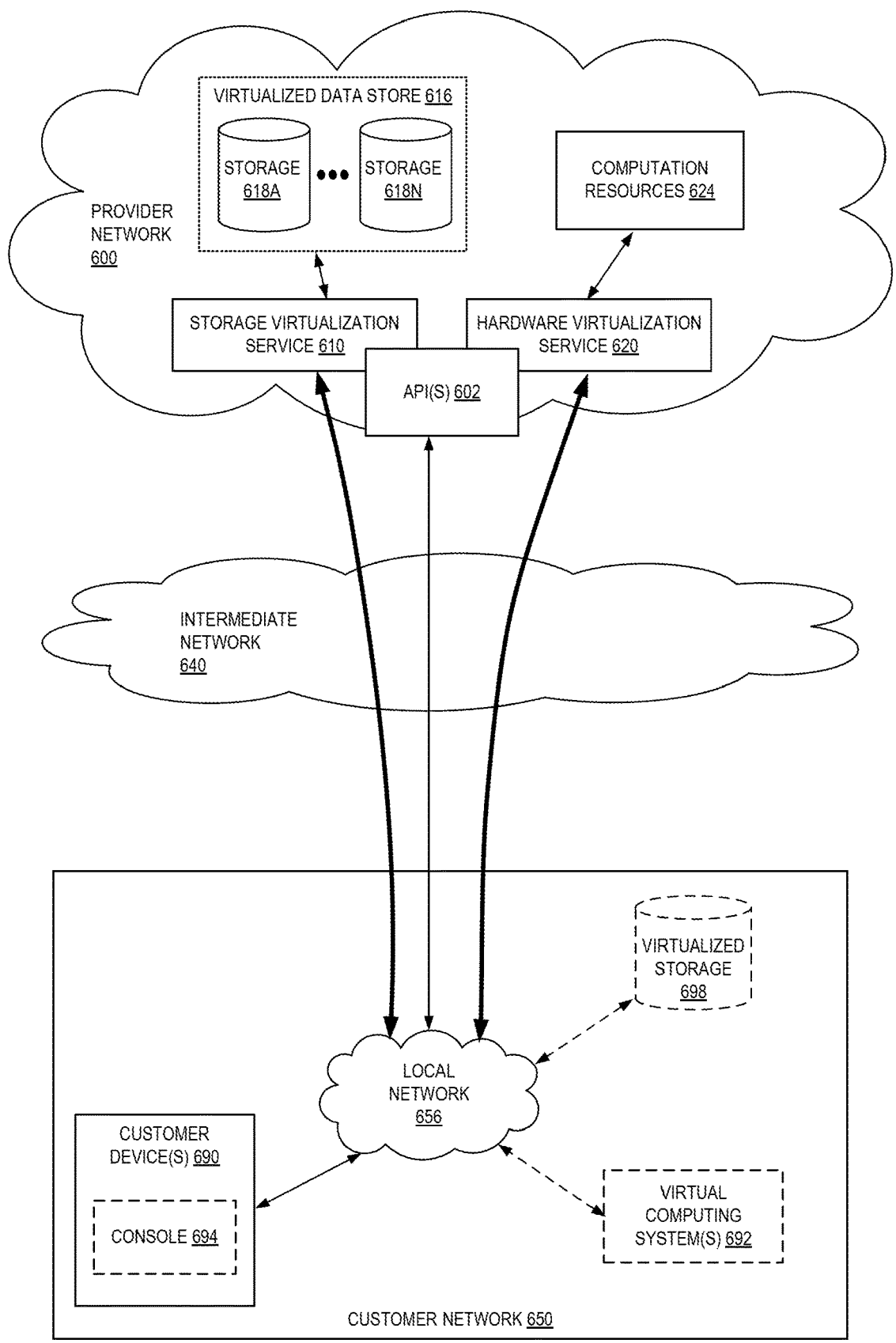
FIG. 6 is a block diagram of an example provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (e.g., VMs) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (e.g., a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (e.g., via console 694), the customer may access the functionality of storage virtualization service 610, for example via one or more APIs 602, to access data from and store data to storage resources 618A-618N of a virtual data store 616 provided by the provider network 600. In some embodiments, a virtualized data store gateway (not shown) may be provided at the customer network 650 that may locally cache at least some data, for example frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Figure 7:
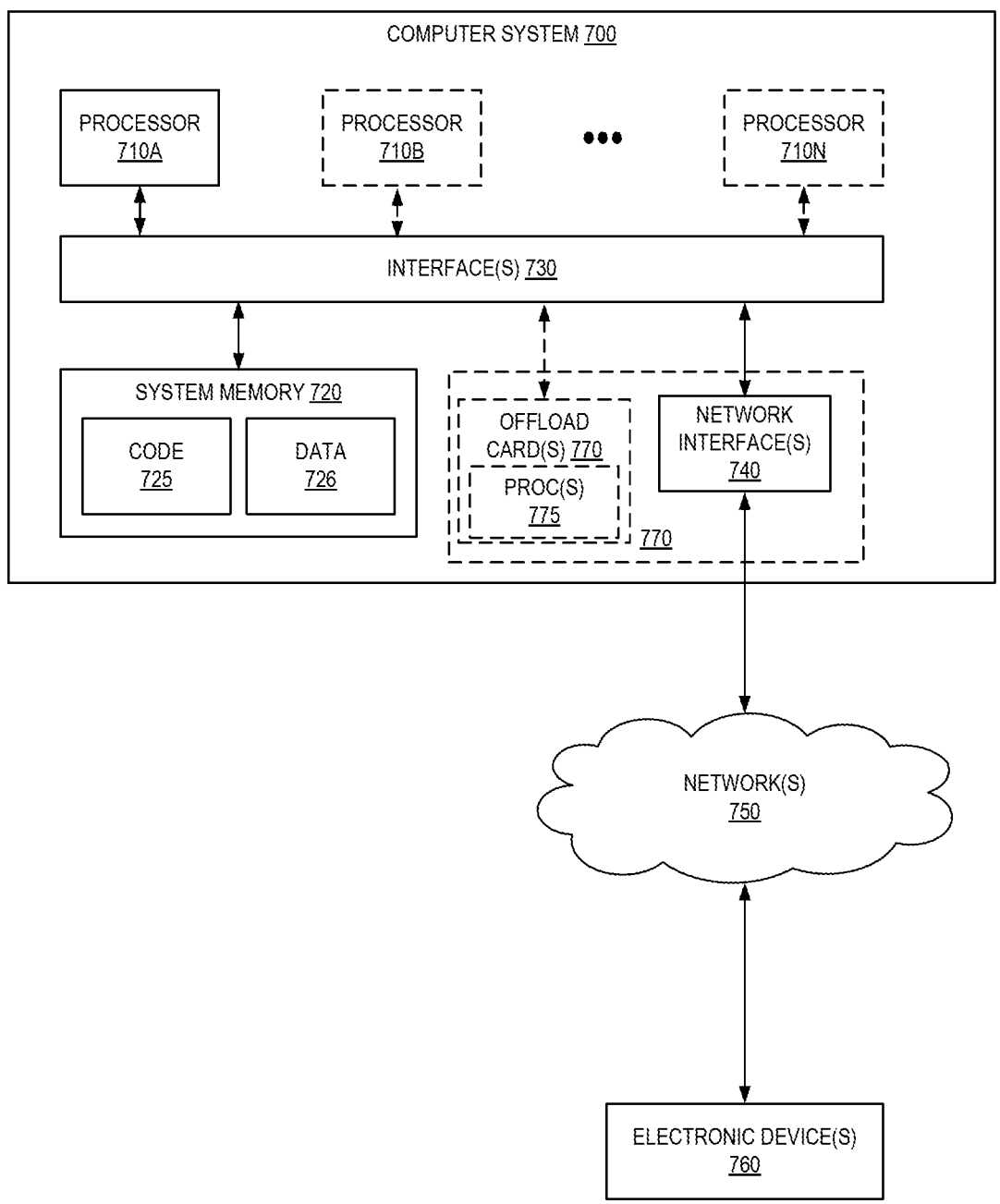
FIG. 7 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities, and may not coordinate with (or service) any hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 104A-104C, 110A-110D, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
generating a snapshot of an application instance running on a host machine in an on premises network, the host machine running a plurality of application instances, the snapshot including the application instance and a file system and a configuration for the application instance;
migrating the application instance from the host machine in the on premises network to an intermediate virtual machine on a second host machine in the on premises network, the intermediate virtual machine created using a virtual machine disk including a file system filter driver, a registry filter driver, and a network filter driver;
monitoring input/output requests made by the application instance on the intermediate virtual machine, the input/output requests including file system calls, registry calls, and network calls;
generating a dependency list for the application instance based at least in part on the input/output requests;
determining the dependency list has not changed in at least a threshold amount of time;
creating a template using the dependency list;
generating a container using the template, the container including the dependencies from the dependency list; and
uploading the container to a provider network, the container to be deployed to a third host machine in the provider network.

2. The computer-implemented method of claim 1, further comprising:
monitoring network traffic generated by the application instance by the network filter driver;
determining at least one port and at least one port mapping using the network traffic;
storing the at least one port and the at least one port mapping in a network settings file; and
adding the network settings file to the template.

3. The computer-implemented method of claim 1, further comprising:
uploading the container to a container hosting system; and
sending a request to the container hosting system to deploy the container to one or more host machines.

4. A computer-implemented method comprising:
migrating an application instance from a first virtual machine on a first host to an isolated virtual machine on a second host, the first host including a plurality of virtual machines, the first host and the second host in a first host environment;
determining a plurality of dependencies of the application instance using a plurality of interceptors on the second host, wherein the plurality of interceptors include a file system filter driver, a registry filter driver, and a network filter driver;
determining the plurality of dependencies has not changed in at least a threshold amount of time;
creating a template including the plurality of dependencies;
generating an application environment using the template; and
uploading the application environment from the first host environment to a second host environment, the application environment to be deployed to a second virtual machine in the second host environment.

5. The computer-implemented method of claim 4, further comprising:
running the application instance in an intermediate virtual machine, the intermediate virtual machine including the plurality of interceptors.

6. The computer-implemented method of claim 5 wherein determining a plurality of dependencies of the application instance using a plurality of interceptors on the second host comprises:
monitoring requests for resources made by the application instance on the intermediate virtual machine using the interceptor; and
adding the resources to a list of dependencies including the at least one dependency.

7. The computer-implemented method of claim 5 wherein determining a plurality of dependencies of the application instance using a plurality of interceptors on the second host comprises:
monitoring requests for resources made by the application instance on the intermediate virtual machine using the interceptor;
determining by the interceptor that at least one resource is not available in the intermediate virtual machine;
retrieving the at least one resource from a snapshot associated with the application instance;
returning the at least one resource to the application instance; and
adding the at least one resource to a list of dependencies including the at least one dependency.

8. The computer-implemented method of claim 7 further comprising generating the snapshot associated with the application instance, wherein the snapshot includes the application instance, a file system, and an operating system-specific configuration data.

9. The computer-implemented method of claim 5 wherein the intermediate virtual machine is the only virtual machine implemented on a host machine in a customer network.

10. The computer-implemented method of claim 5 wherein the intermediate virtual machine is the only virtual machine implemented on a host machine provided by a hardware virtualization service in a provider network.

11. The computer-implemented method of claim 4 further comprising:
generating a second application environment for a second application instance using the template.

12. The computer-implemented method of claim 4 wherein the application environment is a container, and further comprising:
uploading the container to a container service in a provider network; and
sending a request to the container service to deploy the container to one or more host machines in the provider network.

13. A system comprising:
a first one or more electronic devices to execute an application instance; and
a second one or more electronic devices including instructions that upon execution cause the second one or more electronic devices to:
migrate an application instance from a first virtual machine on a first host to an isolated virtual machine on a second host, the first host including a plurality of virtual machines, the first host and the second host in a first host environment;
determine a plurality of dependencies of the application instance using a plurality of interceptors on the second host, wherein the plurality of interceptors include a file system filter driver, a registry filter driver, and a network filter driver;

determine the plurality of dependencies has not changed in at least a threshold amount of time;

create a template including the plurality of dependencies;

generate an application environment using the template; and upload the application environment from the first host environment to a second host environment, the application environment to be deployed to a second virtual machine in the second host environment.

14. The system of claim 13 wherein the instructions upon execution further cause the second one or more electronic devices to:

run the first application instance in an intermediate virtual machine, the intermediate virtual machine including the plurality of interceptors.

15. The system of claim 14 wherein to determine a plurality of dependencies of the application instance using a plurality of interceptors on the second host, the instructions when executed further cause the second one or more electronic devices to:

monitor requests for resources made by the first application instance on the intermediate virtual machine using the interceptor; and add the resources to a list of dependencies including the at least one dependency.

16. The system of claim 14 wherein to determine a plurality of dependencies of the application instance using a plurality of interceptors on the second host, the instructions when executed further cause the second one or more electronic devices to:

monitor requests for resources made by the first application instance on the intermediate virtual machine using the interceptor;

determine by the interceptor that at least one resource is not available in the intermediate virtual machine;

retrieve the at least one resource from a snapshot associated with the first application instance;

return the at least one resource to the first application instance; and add the at least one resource to a list of dependencies including the at least one dependency.

17. The system of claim 13 wherein the instructions, when executed, further cause the second one or more electronic devices to:

generate a second application environment for a second application instance using the template.

18. The system of claim 13 wherein the application environment is a container, and wherein the instructions, when executed, further cause the second one or more electronic devices to:

upload the container to a container service in a provider network; and send a request to the container service to deploy the container to one or more host machines in the provider network.

* * * * *